(12) United States Patent
Horiuchi (10) Patent No.: US 11,701,924 B2
(45) Date of Patent: Jul. 18, 2023

(54) PNEUMATIC TIRE

(71) Applicant: The Yokohama Rubber Co., LTD., Tokyo (JP)

(72) Inventor: Kenji Horiuchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 398 days.

(21) Appl. No.: 16/636,007

(22) PCT Filed: Jul. 26, 2018

(86) PCT No.: PCT/JP2018/028089
§ 371 (c)(1),
(2) Date: Feb. 1, 2020

(87) PCT Pub. No.: WO2019/026758
PCT Pub. Date: Feb. 7, 2019

(65) Prior Publication Data
US 2021/0138842 A1    May 13, 2021

(30) Foreign Application Priority Data

Aug. 2, 2017  (JP) .................................. 2017-149977

(51) Int. Cl.
*B60C 11/11*    (2006.01)
*B60C 11/12*    (2006.01)
(Continued)

(52) U.S. Cl.
CPC ............ *B60C 11/12* (2013.01); *B60C 11/125* (2013.01); *B60C 11/1307* (2013.01);
(Continued)

(58) Field of Classification Search
CPC .................... B60C 11/125; B60C 2011/1213
See application file for complete search history.

(56) References Cited

U.S. PATENT DOCUMENTS 4,598,747 A * 7/1986 Flechtner ............... B60C 11/12
                                                    152/DIG. 3
9,434,215 B2   9/2016 Tanaka
(Continued)

FOREIGN PATENT DOCUMENTS

JP    01-132406 A  *  5/1989
JP    H01-132406       5/1989
(Continued)

OTHER PUBLICATIONS

Machine translation for Japan 01-132406 (Year: 2022).*
International Search Report for International Application No. PCT/JP2018/028089 dated Oct. 9, 2018, 4 pages, Japan.

*Primary Examiner* — Steven D Maki
(74) *Attorney, Agent, or Firm* — Thorpe North & Western (57) ABSTRACT

A pneumatic tire is provided. A tread portion includes shallow grooves formed in a road contact surface of each of shoulder blocks, intermediate blocks, and center blocks, defined by a plurality of longitudinal grooves extending in a tire circumferential direction and a plurality of lateral grooves extending in a tire lateral direction, the shallow groove having a smaller groove depth than the longitudinal groove and the lateral groove. The shallow groove extends along the tire lateral direction, and at least one end thereof communicates with the longitudinal groove or the lateral groove. A contour line of the shallow groove is provided with at least one bend point. A sipe is provided in a flat bottom surface of the shallow groove extending along the shallow groove. Among the shallow grooves, center shallow grooves formed in the center block are each provided with a terminating end portion terminating in the center block.

6 Claims, 4 Drawing Sheets

(51) Int. Cl.
  *B60C 11/13* (2006.01)
  *B60C 11/03* (2006.01)
(52) U.S. Cl.
  CPC ............... *B60C 2011/0346* (2013.01); *B60C 2011/1213* (2013.01); *B60C 2011/133* (2013.01)

(56) References Cited

U.S. PATENT DOCUMENTS

| | | | |
|---|---|---|---|
| 2012/0186710 | A1 | 7/2012 | Zhu |
| 2016/0114629 | A1* | 4/2016 | Hashimoto ............ B60C 11/12 152/209.1 |
| 2016/0137002 | A1 | 5/2016 | Fujioka |
| 2017/0120687 | A1 | 5/2017 | Okawara |
| 2020/0317003 | A1* | 10/2020 | Yoshida ............... B60C 11/03 |
| 2021/0086561 | A1* | 3/2021 | Yoshida ............ B60C 11/1353 |
| 2021/0086563 | A1* | 3/2021 | Yoshida ............ B60C 11/1376 |

FOREIGN PATENT DOCUMENTS

| | | |
|---|---|---|
| JP | 2001-063320 | 3/2001 |
| JP | 2006-151173 | 6/2006 |
| JP | 2009-220779 | 10/2009 |
| JP | 2011-240750 | 12/2011 |
| JP | 2012-532058 | 12/2012 |
| JP | 2014-156190 | 8/2014 |
| JP | 2014-193629 | 10/2014 |
| JP | 2015-163511 | 9/2015 |
| JP | 2016-097712 | 5/2016 |
| JP | 2016-141157 | 8/2016 |
| JP | 2017-081439 | 5/2017 |
| JP | 2017-105364 | 6/2017 |
| WO | WO 2011/002715 | 1/2011 |
| WO | WO 2019/022128 | 1/2019 |
| WO | WO 2019/022129 | 1/2019 |

* cited by examiner

PNEUMATIC TIRE

TECHNICAL FIELD

The present technology relates to a pneumatic tire suitable as a tire for driving on unpaved roads and particularly relates to a pneumatic tire providing enhanced driving performance on unpaved roads while maintaining wear resistance and steering stability on paved roads.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, driving performance on unpaved roads is improved by biting into mud, snow, sand, stone, rock, or the like on a road surface (hereinafter, referred to collectively as "mud or the like") to achieve traction performance and preventing grooves from being blocked with mud or the like (for example, see Japan Unexamined Patent Publication No. 2009-220779).

However, in particular, in a case where the vehicle is intended to travel in rocky areas, attempts are made to make a groove area large to provide sufficient biting into mud or the like (stones and rocks, among others) to obtain traction characteristics, made to provide sipes in each block to increase the number of edge component, or made to enhance adherence to the road surface. This reduces block rigidity, disadvantageously leading to difficulty in maintaining wear resistance and steering stability in a case of traveling on a typical paved road and difficulty in providing these performances in a compatible manner to a high degree. Thus, there is a demand for measures for causing grooves to effectively bite into mud or the like (particularly stones and rocks) to enhance driving performance (performance over rocks) on unpaved roads (particularly rocky areas), while ensuring sufficient wear resistance and steering stability on paved roads, and providing these performances in a well-balanced, compatible manner.

SUMMARY

The present technology provides a pneumatic tire that is suitable as a tire for driving on unpaved roads and that provides enhanced driving performance on unpaved roads while maintaining wear resistance and steering stability on paved roads.

A pneumatic tire according to an embodiment of the present technology includes a pneumatic tire including: a tread portion extending in a tire circumferential direction and having an annular shape; a pair of sidewall portions disposed on both sides of the tread portion; and a pair of bead portions disposed inward of the sidewall portions in a tire radial direction; the tread portion being provided with a plurality of longitudinal grooves extending in the tire circumferential direction, a plurality of lateral grooves extending in a tire lateral direction, and a plurality of blocks defined by the longitudinal grooves and the lateral grooves; the plurality of blocks including: shoulder blocks located on an outermost side in the tire lateral direction, center blocks located closest to a tire equator, and intermediate blocks located between the shoulder block and the center block; shallow grooves having a smaller groove depth than the lateral grooves and the longitudinal grooves being formed in a road contact surface of each of the blocks; the shallow grooves extending in the tire lateral direction and at least one end thereof communicating with the lateral groove or the longitudinal groove; a contour line of the shallow groove including at least one bend point; the shallow groove including a flat bottom surface and a sipe formed in the bottom surface and extending along the shallow groove; and among the shallow grooves, center shallow grooves formed in the center block each including a terminating end portion terminating in the center block instead of communicating with the lateral groove or the longitudinal groove.

In the present technology, in a tire intended to provide enhanced driving performance (e.g., performance over rocks, etc.) on unpaved roads based on blocks as described above, the shallow grooves and the sipes are further provided in the block road contact surface as described above to enhance traction characteristics and road surface followability to improve driving performance on unpaved roads (e.g. performance over rocks). This allows avoidance of a significant decrease in block rigidity leading to degraded wear resistance and steering stability and provides both wear resistance performance and steering stability performance on paved roads and driving performance on unpaved roads (e.g., performance over rocks) in a compatible manner. In this case, shallow grooves having bend points allow the traction characteristics to be effectively enhanced to improve the driving performance (e.g., performance over rocks) on unpaved roads. Additionally, the center shallow groove formed in the center block, contributing to steering stability, includes a terminating end portion, allowing the rigidity of the center block to be ensured, with the shallow grooves and the sipes producing an edge effect. Thus, both wear resistance performance and steering stability performance on paved roads and driving performance on unpaved roads (e.g., performance over rocks) can be provided in a compatible manner to a high degree.

In the present technology, preferably, the shallow groove includes three or more bend points. Accordingly, traction characteristics in various directions can be ensured, and the bend points themselves bite into mud or the like. This is advantageous in enhancing the driving performance on unpaved roads (e.g., performance over rocks).

In the present technology, preferably, the number of the bend points of the shallow grooves formed in the blocks on an outer side in the tire lateral direction is fewer than the number of the bend points the shallow grooves formed in the blocks on a tire equator side. Adjustment of the number of bend points as described above enables the edge effect and the road surface followability to be enhanced on the tire equator side. This is advantageous in enhancing the driving performance on unpaved roads (e.g., performance over rocks).

In the present technology, preferably, the shallow groove has a groove depth of from 1.5 mm to 2.5 mm. Accordingly, a sufficient edge effect of the shallow grooves can be ensured while avoiding the shallow grooves decreasing block rigidity, and this is advantageous in providing both wear resistance performance and steering stability performance on paved roads and driving performance on unpaved roads (e.g., performance over rocks) in a compatible manner.

In the present technology, the center shallow grooves include: first center shallow grooves each branching in the road contact surface and including two terminating end portions; and second center shallow grooves each branching in the road contact surface and including only one terminating end portion, and the center blocks where the first center shallow groove is formed therein and the center blocks where the second center shallow groove is formed therein are alternately disposed on each of one side and other side of the tire equator in the tire circumferential direction. The thus disposed center blocks with the shallow grooves with different configurations enable the traction characteristics in multiple directions to be ensured. This is advantageous in enhancing the driving performance on unpaved roads (e.g., performance over rocks).

In the present technology, various lengths are lengths in the tread contact surface unless otherwise noted. "Road contact surface" of each block is a surface portion of each block actually contacting a plane on which the tire is placed, in a case where the tire is mounted on a regular rim, inflated to a regular internal pressure, vertically placed on a plane, and subjected to a regular load. The road contact surface does not include, for example, a chamfered portion that does not actually contact the plane. Additionally, "ground contact edge" refers to both ends in the tire axial direction in this state.

"Regular rim" is a rim defined for each tire by a standard in a system of standards including the standard on which the tire is based and refers to a "standard rim" in a case of JATMA (Japan Automobile Tyre Manufacturers Association, Inc.), refers to a "design rim" in a case of TRA (The Tire and Rim Association, Inc.), or refers to a "measuring rim" in a case of ETRTO (European Tire and Rim Technical Organization). "Regular internal pressure" is an air pressure defined for each tire by a standard in a system of standards including the standard on which the tire is based and refers to the "maximum air pressure" in a case of JATMA, refers to the maximum value in the table "TIRE ROAD LIMITS AT VARIOUS COLD INFLATION PRESSURES" in a case of TRA, or refers to the "INFLATION PRESSURE" in a case of ETRTO. For a tire for a passenger vehicle, the regular internal pressure is 180 kPa. "Regular load" is a load defined for each tire by a standard in a system of standards including the standard on which the tire is based and refers to the "maximum load capacity" in a case of JATMA, refers to the maximum value in the table "TIRE ROAD LIMITS AT VARIOUS COLD INFLATION PRESSURES" in a case of TRA, or refers to "LOAD CAPACITY" in a case of ETRTO. For a tire for a passenger vehicle, the regular load is a load corresponding to 88% of the load described above.

DETAILED DESCRIPTION

Configurations of embodiments of the present technology will be described in detail below with reference to the accompanying drawings.

Figure 1:
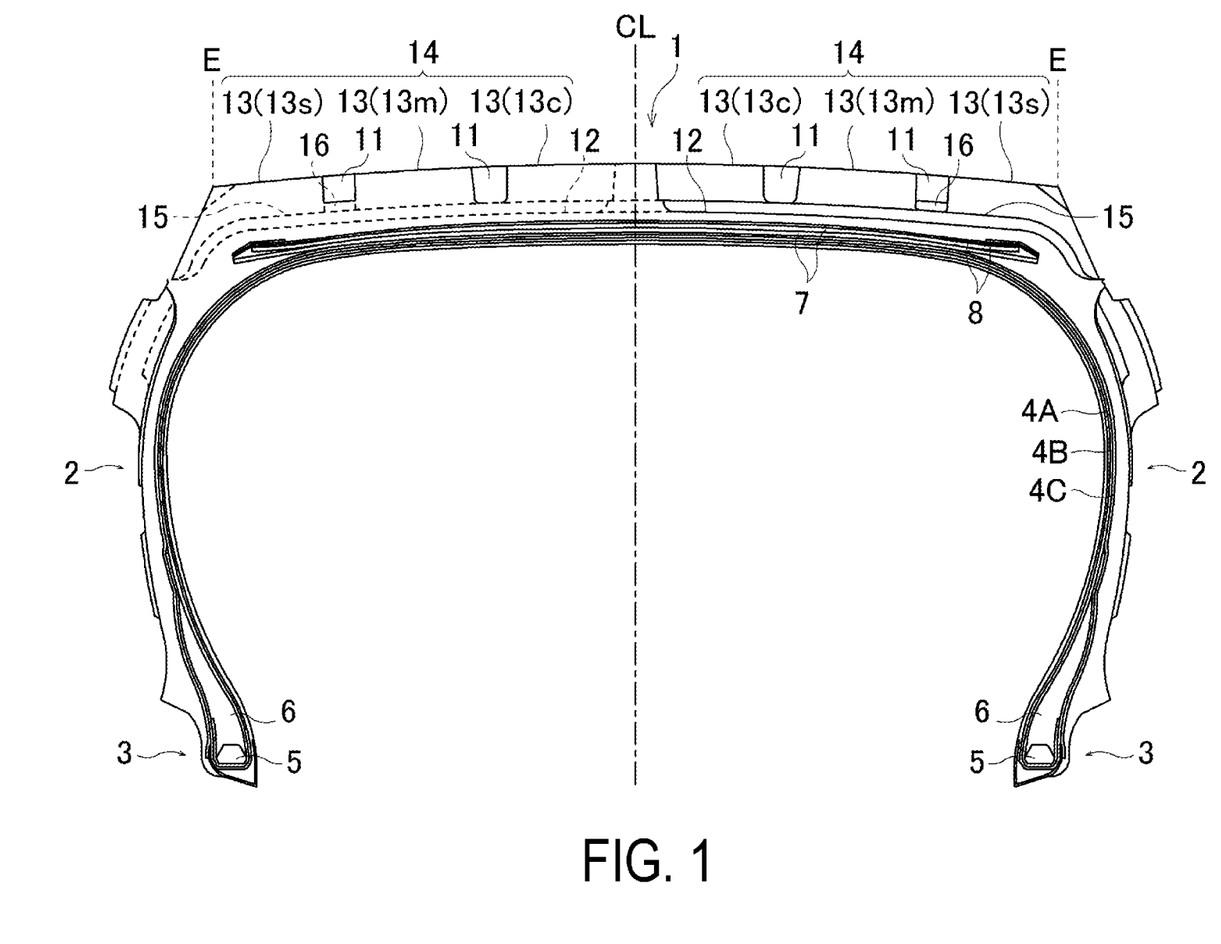
FIG. 1 is a meridian cross-sectional view of a pneumatic tire according to an embodiment of the present technology.

As illustrated in FIG. 1, the pneumatic tire of an embodiment of the present technology includes a tread portion 1 having an annular shape and extending in the tire circumferential direction, a pair of sidewall portions 2 disposed on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge.

In the example in FIG. 1, three carcass layers 4A, 4B, and 4C are mounted between the pair of left and right bead portions 3. Each of the carcass layers 4A, 4B, and 4C includes a plurality of reinforcing cords extending in the tire radial direction. The carcass layers 4A and 4B are folded back from a vehicle inner side to a vehicle outer side around a bead core 5 disposed in each of the bead portions 3. Additionally, bead fillers 6 are disposed on the outer periphery of the respective bead cores 5, and each of the bead fillers 6 is enveloped by a body portion and a folded back portion of the carcass layers 4A and 4B. The carcass layer 4C is disposed on an outer circumferential side of the carcass layers 4A and 4B along the carcass layers 4A and 4B. In the tread portion 1, a plurality of belt layers 7 (two layers in FIG. 1) are embedded on an outer circumferential side of the carcass layers 4A, 4B, and 4C. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, from 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, from 0° to 5°.

The present technology may be applied to such a general pneumatic tire; however, the cross-sectional structure thereof is not limited to the basic structure described above.

Figure 2:
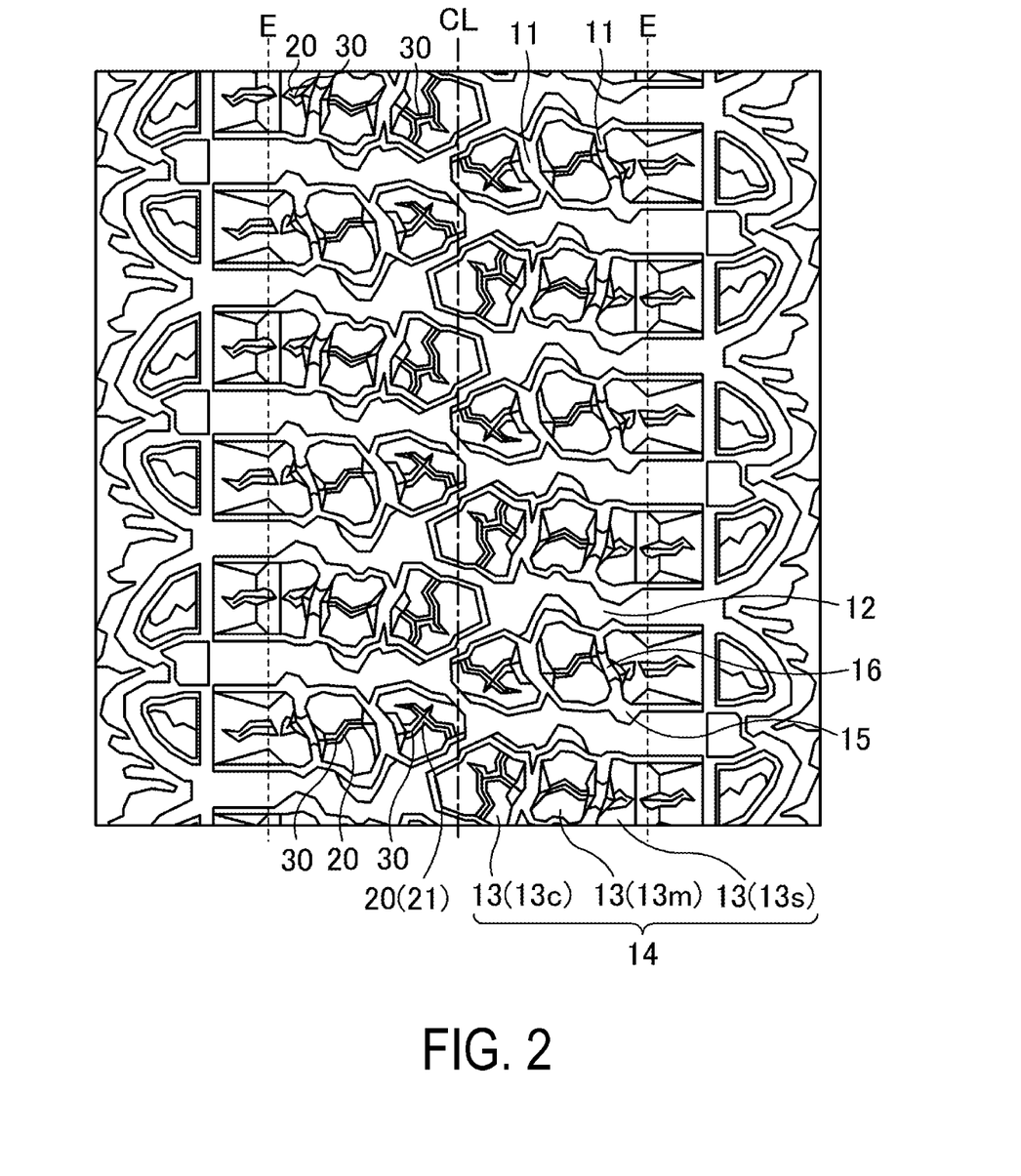
FIG. 2 is a front view illustrating a tread surface of a pneumatic tire according to an embodiment of the present technology.

As illustrated in FIG. 2, an outer surface of the tread portion 1 of the pneumatic tire of the present technology is provided with a plurality of longitudinal grooves 11 extending in the tire circumferential direction, a plurality of lateral grooves 12 extending in the tire lateral direction, and a plurality of blocks 13 defined by the longitudinal grooves 11 and the lateral grooves 12. In this case, in order to enhance the driving performance on unpaved roads (e.g., performance over rocks), the ratio (groove area ratio), to the entire area of a ground contact region (the region between ground contact edges E), of the groove area of the longitudinal grooves 11 and the lateral grooves 12 (the area of only the longitudinal grooves 11 and the lateral grooves 12, not including the area of shallow grooves 20 and sipes 30 described below) is set from 50% to 70%, for example. In particular, in the present technology, the plurality of blocks include shoulder blocks 13s located on an outermost side in the tire lateral direction, center blocks 13c located closest to a tire equator CL, and intermediate blocks 13m located between the shoulder block 13s and the center block 13c. The blocks 13 (each including the shoulder block 13s, center block 13c, and intermediate block 13m) are arranged side by side along the tire lateral direction with respect to the shoulder blocks 13s to form a block group 14. Block groups 14 each including the blocks 13 are repeatedly arranged in the tire circumferential direction with the lateral grooves 12 interposed between the block groups 14.

In the illustrated example, the block group 14 including the blocks 13 includes a flat top surface raised from the groove bottoms of the lateral grooves 12 and a platform 15 having a stage shape is present on the top surface, on which the blocks 13 and the longitudinal grooves 11 can be disposed. In this case, the longitudinal grooves 11 located between the blocks 13 forming each of the block groups 14 are also present on the platform 15, and the groove bottoms of the longitudinal grooves 11 are located flush with the platform 15 or closer to a block road contact surface than a top surface of the platform 15. Each of the platforms 15, as viewed from the block road contact surface, has a shape that protrudes toward both sides in the tire circumferential direction with respect to at least three blocks 13 forming each of the platforms 15, and the contour line of each of the platforms 15 bends along the contour lines of at least three blocks 13 forming each of the platforms 15.

In addition, in the illustrated example, at the groove bottom of the longitudinal groove 11 adjacent to the shoulder block 13s, a raised bottom portion 16 is provided, which is raised from the groove bottom of the longitudinal groove 11. The raised bottom portion 16 couples the shoulder block 13s to the intermediate block 13m.

The present technology relates to the shallow grooves 20 described below provided in each of the blocks 13, and thus the overall shape of the tread pattern is not limited to the illustrated aspect as long as the shoulder block 13s, the center block 13c, and the intermediate block 13m described above are present, in which the shallow grooves 20 are provided. Note that the tread pattern in FIG. 2 cooperates with the shallow grooves 20 described below in delivering excellent driving performance on unpaved roads.

Figure 3:
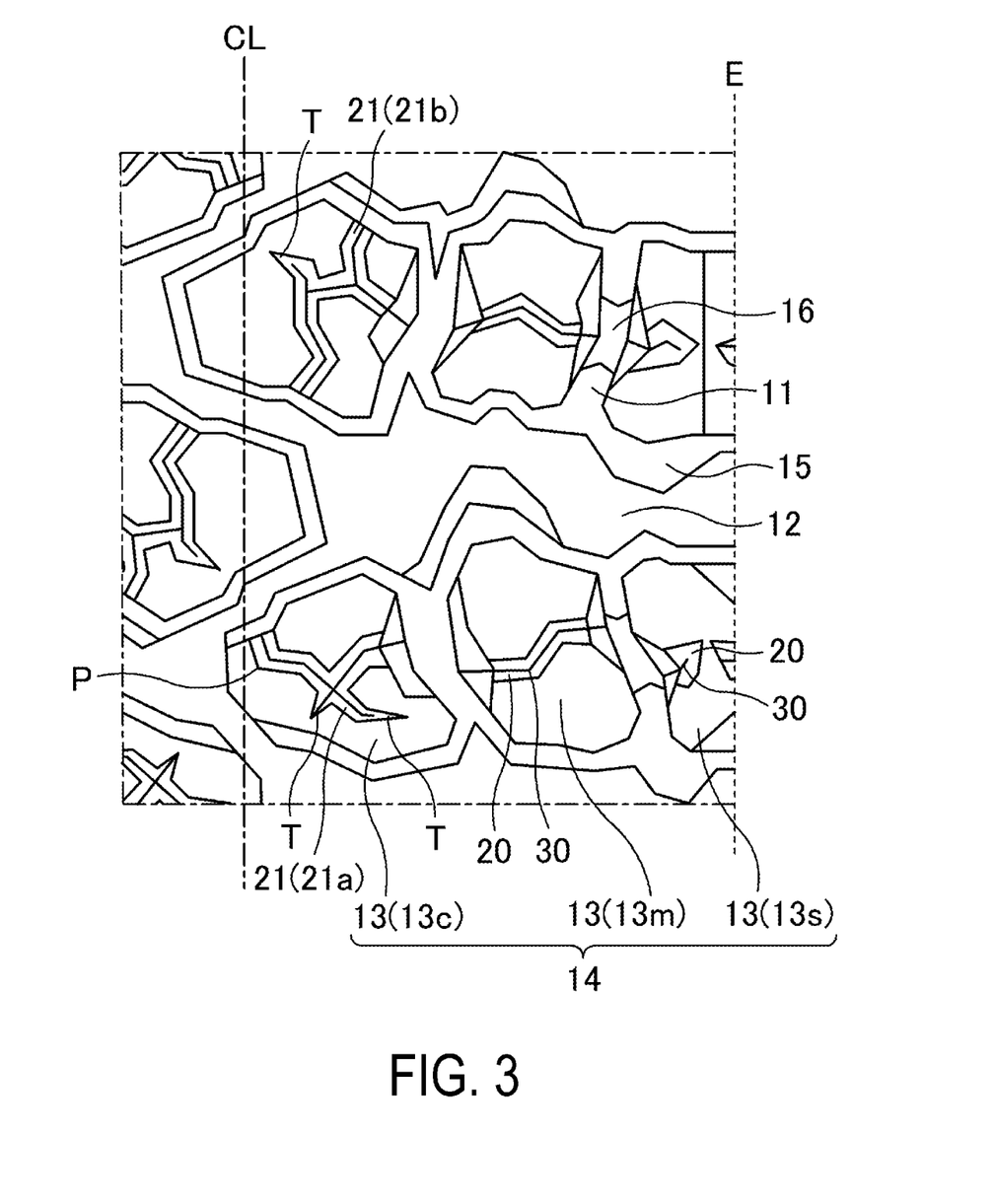
FIG. 3 is an explanatory diagram illustrating an enlarged front view of a block in FIG. 2.
Figure 4:
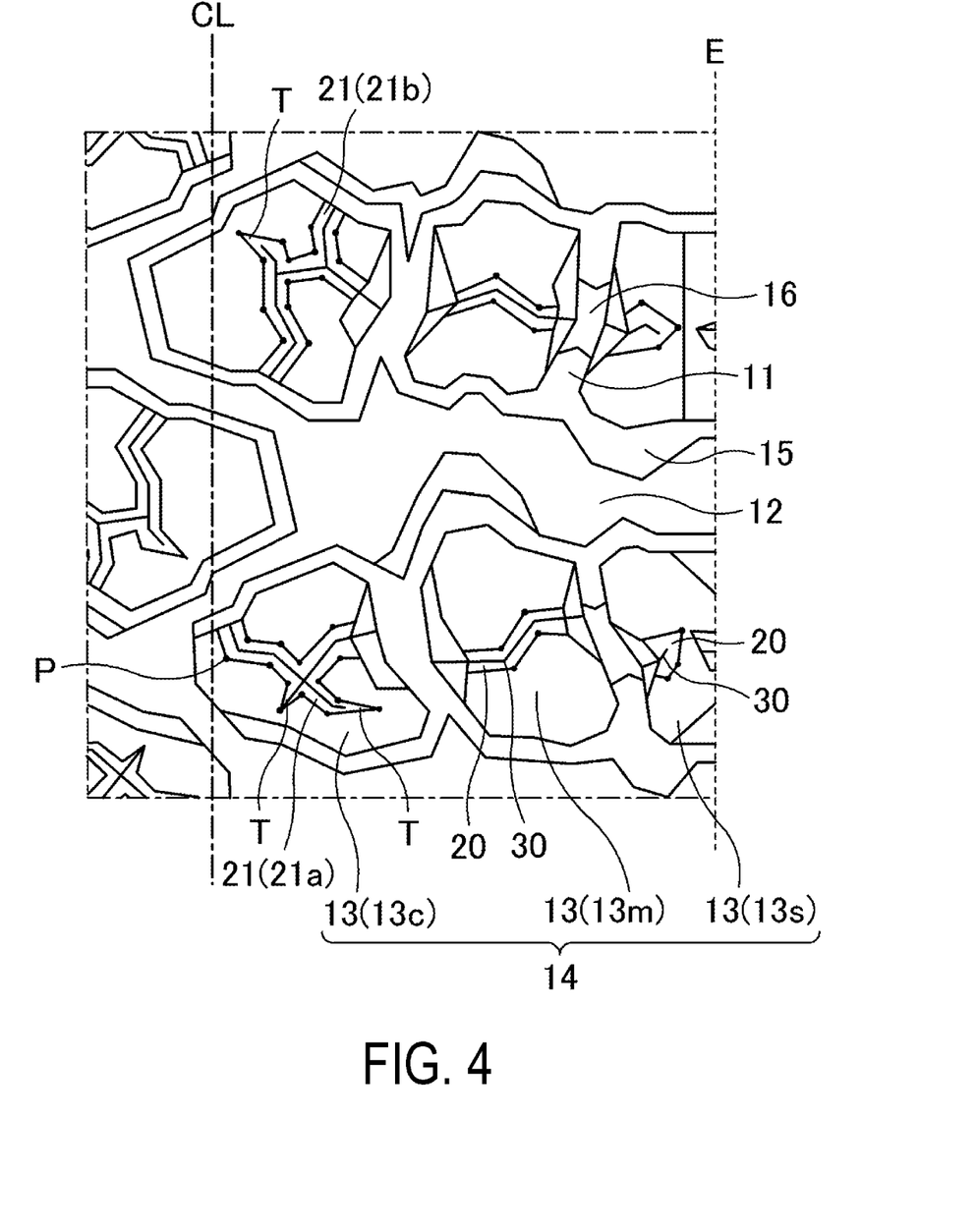
FIG. 4 is an explanatory diagram emphasizing bend points in FIG. 3.

In the present technology, as illustrated in enlarged diagrams in FIG. 3 and FIG. 4, each of the shallow grooves 20 is formed on the road contact surface of each of the blocks 13 including the shoulder block 13s, the center block 13c, and the intermediate block 13m. The shallow groove 20 is a groove having a groove depth smaller than the groove depths of the longitudinal groove 11 and the lateral groove 12, and the contour line of the shallow groove 20 necessarily includes at least one bend point P. Note that the bend points P are points where straight lines forming the contour lines of the shallow grooves 20 meet each other, as emphatically illustrated by points in FIG. 4 but that portions where straight lines forming the contour lines of the shallow grooves 20 are connected together in an arc with a radius of 6 mm or less are also considered to be the bend points P. For example, in the example in FIG. 3 and FIG. 4, the shallow grooves 20 provided in the center block 13c in each of the block group 14 include 14 bend points P, the shallow grooves 20 provided in the intermediate block 13m include four bend points P, and the shallow grooves 20 provided in the shoulder block 13s include three bend points P. Additionally, each of the shallow grooves 20 includes a flat bottom surface and the sipe 30 formed in the bottom surface and extending along the shallow groove 20. The sipe 30 is a fine groove having a groove width of 1.5 mm or less. The flat groove bottom of the shallow groove 20 may be substantially parallel to the block road contact surface, with an inclination of 5° or less with respect to the block road contact surface.

All of the shallow grooves 20 extend along the tire lateral direction, and at least one end of each of the shallow grooves 20 communicates with the longitudinal groove 11 or the lateral groove 12. For example, in FIG. 3 and FIG. 4, the shallow groove 20 provided in the center block 13c branches and communicates with the longitudinal groove 11 or the lateral groove 12 at a plurality of ends thereof, the shallow groove 20 provided in the intermediate block 13m communicates with the longitudinal grooves 11 at both ends thereof, and the shallow groove 20 provided in the shoulder block 13s communicates with the longitudinal groove 11 at an end thereof on the equator side. However, among the shallow grooves 20, the shallow groove 20 (hereinafter referred to as a center shallow groove 21) formed in the center block 13c necessarily includes a terminating end portion T terminating within the center block 13c instead of communicating with the longitudinal groove 11 or the lateral groove 12, in addition to the other ends described above that communicate with the longitudinal groove 11 or the lateral groove 12.

The thus provided shallow grooves 20 increase the number of edge components defined by the shallow grooves 20, allowing traction characteristics to be enhanced. Additionally, the sipes 30 provided at the groove bottoms of the shallow grooves 20 allow road surface followability of the block road contact surface to be enhanced. Furthermore, the bend points P of the shallow grooves 20 allow the traction characteristics in different directions to be ensured, and the bend points P themselves bite into mud or the like, allowing the traction characteristics to be effectively enhanced. On the other hand, the shallow groove 20 has a sufficiently small groove depth compared to the longitudinal groove 11 and the lateral groove 12, and the sipe 30 has a sufficiently small groove depth compared to the longitudinal groove 11 and the lateral groove 12. Thus, the provision of the shallow grooves 20 and the sipes 30 is not a factor significantly reducing block rigidity. Thus, both wear resistance performance and steering stability performance can be favorably maintained. As a result, both driving performance on unpaved roads (e.g., performance over rocks) and wear resistance performance and steering stability performance can be provided in a compatible manner. Additionally, the center shallow groove 21 formed in the center block 13c contributing to steering stability is provided with the terminating end portion T, thus allowing the center block 13c to be provided with sufficient rigidity, with the shallow grooves 20 and the sipes 30 producing an edge effect. This is advantageous in providing both wear resistance performance and steering stability performance on paved roads and driving performance on unpaved roads (e.g., performance over rocks) in a compatible manner.

The shallow groove 20 is a groove having a groove depth smaller than the groove depths of the longitudinal groove 11 and the lateral groove 12 as described above, but in particular, the shallow groove 20 preferably has a groove depth of from 1.5 mm to 2.5 mm. Accordingly, a sufficient edge effect of the shallow grooves 20 can be ensured, while avoiding the shallow grooves 20 decreasing block rigidity. This is advantageous in providing both driving performance (e.g., performance over rocks, etc.) on unpaved roads and wear resistance performance and steering stability performance in a compatible manner. When having a groove depth of less than 1.5 mm, the shallow grooves 20 have difficulty producing a sufficient edge effect. When the shallow grooves have a groove depth of greater than 2.5 mm, the block rigidity decreases, leading to difficulty in maintaining sufficient wear resistance. Note that the groove width of the shallow grooves 20 is not particularly limited but may be from 3 mm to 12 mm, for example, in consideration of the size of each of the blocks 13.

More bend points P of each of the shallow grooves 20 produce a higher effect from the bend points P, and thus three or more bend points P are preferably provided. Specifically, more bend points P produce an enhanced edge effect and allow the traction characteristics in various directions to be ensured. This is advantageous in enhancing the driving performance on unpaved roads (e.g., performance over rocks). In this case, in a case where the bend points P are located in close proximity, the edge components between the bend points P are shortened, leading to difficulty in producing a sufficient edge effect. Thus, the interval between the bend points P is preferably greater than the groove depth of the shallow groove 20.

In a case where the shallow groove 20 is provided in each of the blocks 13, the number of the bend points P of the shallow grooves 20 formed in the blocks 13 on the outer side in the tire lateral direction preferably is fewer than the number of the bend points P of the shallow grooves 20 formed in the blocks 13 on the tire equator CL side. For example, in the illustrated example, the shallow grooves 20 provided in the intermediate block 13m include fewer bend points P than the shallow grooves 20 provided in the center block 13c (center shallow groove 21), and the shallow grooves 20 provided in the shoulder block 13s include fewer bend points P than the shallow grooves 20 provided in the intermediate block 13m. Adjustment of the number of bend points P as described above enables the edge effect and the road surface followability to be enhanced on the tire equator CL side. This is advantageous in enhancing the driving performance on unpaved roads (e.g., performance over rocks).

The center shallow grooves 21 may have a structure common to all of the center blocks 13c. However, preferably, the center shallow grooves 21 includes first center shallow grooves 21a each branching in the road contact surface and including two terminating ends T; and second center shallow grooves 21b each branching in the road contact surface and including only one terminating end portion T, as illustrated. In a case where the center shallow grooves 21 includes the first center shallow grooves 21a and the second center shallow groove 21b as described above, the center blocks 13c where the first center shallow groove 21a is formed therein and the center blocks 13c where the second center shallow groove 21b is formed therein are alternately disposed on each of one side and the other side of the tire equator in the tire circumferential direction. With the center blocks 13c with the shallow grooves 20 with different configurations disposed as described above, the traction characteristics in multiple directions can be ensured. This is advantageous in enhancing the driving performance on unpaved roads (e.g., performance over rocks).

Example

Twelve types of tires according to Comparative Examples 1 to 4 and Examples 1 to 8 were manufactured. The tires have a tire size of 35×12.50R17, have a basic structure illustrated in FIG. 1, and are based on the tread pattern in FIG. 2. The tires are set for each of: the presence of the shallow groove, the groove depth of the shallow groove, the number of the bend points of the shallow grooves provided in each block, the presence of the sipe at the groove bottom of the shallow groove, the presence of the terminating end portion of the center shallow groove, and the number of terminating end portions of the center shallow groove as indicated in Table 1.

Note that Comparative Example 1 is an example including neither shallow grooves nor sipes and is an aspect corresponding to the tread pattern in FIG. 2 from which the shallow grooves and sipes in each portion are omitted.

Comparative Example 2 is an example based on the tread pattern of FIG. 2, in which the contour line of each shallow groove is formed only of a straight line, and in which all of the shallow grooves at both ends communicate with the longitudinal groove or the lateral groove without branching and thus include no bend points, with the sipes omitted. Comparative Examples 3 and 4 are examples in which the presence of the sipe and the number of bend points are adjusted based on the tread pattern in FIG. 2.

For the "number of terminating end portions of center shallow grooves" in Table 1, in a case where the center shallow grooves include: the first center shallow grooves each branching in the road contact surface and including two terminating end portions; and the second center shallow grooves each branching in the road contact surface and including only one terminating end portion as illustrated in FIG. 2, the numbers of terminating end portions in the first and second center shallow grooves are indicated as "½".

The pneumatic tires are evaluated for wear resistance, steering stability, and performance over rocks by the following evaluation method, and the results are also indicated in Table 1.

Wear Resistance

The test tires were assembled on wheels with a rim size of 17×10.0J, inflated to an air pressure of 240 kPa, and mounted on a test vehicle (four wheel drive vehicle). After driving on a paved road for 30000 km, the amount of wear after driving was measured. Evaluation results are expressed as index values with the reciprocal of each measurement value in Conventional Example 1 being assigned the index value of 100. Larger index values indicate smaller amount of wear and more excellent wear resistance. Note that an index value of "95" or greater means maintenance of excellent wear resistance equivalent to wear resistance achieved in a case where no shallow grooves are provided.

Steering Stability

The test tires were assembled on wheels with a rim size of 17×10.0 J, inflated to an air pressure of 240 kPa, and mounted on a test vehicle (four wheel drive vehicle). Sensory evaluations by a test driver were conducted on a paved road for steering stability. Evaluation results are expressed as index values with Conventional Example 1 being assigned the index value of 100. Larger index values indicate more excellent steering stability. Note that an index value of "95" or greater means maintenance of excellent steering stability equivalent to steering stability achieved in a case where no shallow grooves are provided.

Performance Over Rocks

The test tires were assembled on wheels with a rim size of 17×10.0J, inflated to an air pressure of 240 kPa, and mounted on a test vehicle (four wheel drive vehicle). Sensory evaluations by a test driver were conducted on a sloped part of a rocky road surface for climbing performance. Evaluation results are expressed as index values with Conventional Example 1 being assigned the index value of 100. Larger index values indicate more excellent performance over rocks. Note that an index value of "109" or smaller indicates that performance over rocks has not been sufficiently enhanced and that an index value of "110" or greater means indication of particularly excellent performance over rocks.

TABLE 1

| | | | Comparative Example 1 | Comparative Example 2 | Comparative Example 3 | Comparative Example 4 |
|---|---|---|---|---|---|---|
| Presence of shallow groove | | | No | Yes | Yes | Yes |
| Groove depth of shallow groove (%) | | mm | — | 3 | 3 | 3 |
| Number of bend points | Center | Number of bend points | — | 0 | 2 | 2 |

TABLE 1-continued

|  |  |  |  |  |  |
|---|---|---|---|---|---|
| Intermediate | Number of bend points | — | 0 | 2 | 2 |
| Shoulder | Number of bend points | — | 0 | 2 | 2 |
| Presence of sipes |  | — | No | No | Yes |
| Presence of terminating end portion |  | — | No | No | No |
| Number of terminating end portions of center shallow grooves |  | — | — | — | — |
| Wear resistance | Index value | 100 | 94 | 94 | 94 |
| Steering stability | Index value | 100 | 94 | 94 | 94 |
| Performance over rocks | Index value | 100 | 102 | 105 | 108 |

|  |  |  | Example 1 | Example 2 | Example 3 | Example 4 |
|---|---|---|---|---|---|---|
| Presence of shallow groove |  |  | Yes | Yes | Yes | Yes |
| Groove depth of shallow groove (%) |  | mm | 3 | 3 | 3 | 2.5 |
| Number of bend points | Center | Number of bend points | 2 | 3 | 14 | 14 |
|  | Intermediate | Number of bend points | 2 | 3 | 4 | 4 |
|  | Shoulder | Number of bend points | 2 | 3 | 3 | 3 |
| Presence of sipes |  |  | Yes | Yes | Yes | Yes |
| Presence of terminating end portion |  |  | Yes | Yes | Yes | Yes |
| Number of terminating end portions of center shallow grooves |  |  | 1 | 1 | 1 | 1 |
| Wear resistance |  | Index value | 96 | 96 | 96 | 97 |
| Steering stability |  | Index value | 96 | 96 | 96 | 97 |
| Performance over rocks |  | Index value | 110 | 112 | 115 | 113 |

|  |  |  | Example 5 | Example 6 | Example 7 | Example 8 |
|---|---|---|---|---|---|---|
| Presence of shallow groove |  |  | Yes | Yes | Yes | Yes |
| Groove depth of shallow groove (%) |  | mm | 2 | 1.5 | 1 | 2 |
| Number of bend points | Center | Number of bend points | 14 | 14 | 14 | 14 |
|  | Intermediate | Number of bend points | 4 | 4 | 4 | 4 |
|  | Shoulder | Number of bend points | 3 | 3 | 3 | 3 |
| Presence of sipes |  |  | Yes | Yes | Yes | Yes |
| Presence of terminating end portion |  |  | Yes | Yes | Yes | Yes |
| Number of terminating end portions of center shallow grooves |  |  | 1 | 1 | 1 | 1/2 |
| Wear resistance |  | Index value | 98 | 99 | 100 | 98 |
| Steering stability |  | Index value | 98 | 99 | 100 | 98 |
| Performance over rocks |  | Index value | 112 | 111 | 110 | 115 |

As is clear from Table 1, compared to Comparative Example 1, Examples 1 to 8 enhance performance over rocks while maintaining wear resistance and steering stability. Note that only performance over rocks on the rocky road surface is evaluated but that, even in a case of traveling on other unpaved roads (mud roads, snowy roads, sandy ground, or the like), the tire according to the embodiment of the present technology exhibits a function, similar to the function accomplished on rocks on the rocky road surface, on mud, snow, sand, stones, and the like on the road surface, favorably delivering excellent driving performance on unpaved roads.

On the other hand, Comparative Examples 2 and 3 include shallow grooves each lacking one or all of the bend point, the sipe, and the terminating end portion and thus fail to sufficiently enhance performance over rocks.

The invention claimed is:

1. A pneumatic tire comprising: a tread portion extending in a tire circumferential direction and having an annular shape; a pair of sidewall portions disposed on both sides of the tread portion; and a pair of bead portions disposed inward of the sidewall portions in a tire radial direction;

the tread portion being provided with a plurality of longitudinal grooves extending in the tire circumferential direction, a plurality of lateral grooves extending in a tire lateral direction, and a plurality of blocks defined by the longitudinal grooves and the lateral grooves, the plurality of blocks comprising: shoulder blocks located on an outermost side in the tire lateral direction, center blocks located closest to a tire equator, and intermediate blocks located between the shoulder blocks and the center blocks, shallow grooves having a smaller groove depth than the lateral grooves and the longitudinal grooves being formed in a road contact surface of each of the blocks, the shallow grooves extending in the tire lateral direction, and at least one end thereof communicating with at least one of the lateral grooves or at least one of the longitudinal grooves, a contour line of the shallow grooves including at least one bend point, the shallow grooves including a flat bottom surface and a sipe formed in the bottom surface and extending along the shallow grooves, and among the shallow grooves, center shallow grooves formed in the center blocks each including a terminating end portion terminating in the center blocks instead of communicating with the at least one of the lateral grooves or the at least one of the longitudinal grooves; wherein the center shallow grooves comprise: first center shallow grooves each branching in the road contact surface and including two terminating end portions; and second center shallow grooves each branching in the road contact surface and including only one terminating end portion, and the center blocks where the first center shallow grooves are formed therein and the center blocks where the second center shallow grooves are formed therein are alternately disposed on each of one side and other side of the tire equator in the tire circumferential direction.

2. The pneumatic tire according to claim 1, wherein the shallow grooves each comprise three or more bend points.

3. The pneumatic tire according to claim 2, wherein the number of the bend points of the shallow grooves formed in the blocks on an outer side in the tire lateral direction is fewer than the number of the bend points of the shallow grooves formed in the blocks on a tire equator side.

4. The pneumatic tire according to claim 3, wherein the shallow grooves have a groove depth of from 1.5 mm to 2.5 mm.

5. The pneumatic tire according to claim 1, wherein the number of the bend points of the shallow grooves formed in the blocks on an outer side in the tire lateral direction is fewer than the number of the bend points of the shallow grooves formed in the blocks on a tire equator side.

6. The pneumatic tire according to claim 1, wherein the shallow grooves have a groove depth of from 1.5 mm to 2.5 mm.

\* \* \* \* \*